(12) United States Patent
Kim et al.

(10) Patent No.: US 8,050,663 B2
(45) Date of Patent: Nov. 1, 2011

(54) SYSTEM AND METHOD OF PROVIDING CONTENTS FOR MOBILE COMMUNICATION TERMINAL

(75) Inventors: Sung-Woo Kim, Seoul (KR); In-Wook Seo, Seoul (KR); Gap-Chun Back, Seoul (KR)

(73) Assignee: KT Corporation, Seoul (KR)

( * ) Notice: Subject to any disclaimer, the term of this patent is extended or adjusted under 35 U.S.C. 154(b) by 622 days.

(21) Appl. No.: 11/724,698

(22) Filed: Mar. 16, 2007

(65) Prior Publication Data

US 2007/0162538 A1  Jul. 12, 2007

Related U.S. Application Data

(63) Continuation of application No. PCT/KR2006/001369, filed on Apr. 13, 2006.

(30) Foreign Application Priority Data

Apr. 15, 2005 (KR) .......................... 10-2005-0031232
Apr. 15, 2005 (KR) .......................... 10-2005-0031237

(51) Int. Cl.
*H04M 3/42* (2006.01)

(52) U.S. Cl. ..................................... 455/414.1; 709/200

(58) Field of Classification Search ................ 455/414.1; 709/200
See application file for complete search history.

(56) References Cited

U.S. PATENT DOCUMENTS

| | | | | |
|---|---|---|---|---|
| 5,349,678 A | * | 9/1994 | Morris et al. | 709/219 |
| 5,410,543 A | * | 4/1995 | Seitz et al. | 370/463 |
| 6,072,493 A | * | 6/2000 | Driskell et al. | 715/854 |
| 6,493,871 B1 | * | 12/2002 | McGuire et al. | 717/173 |
| 6,529,586 B1 | | 3/2003 | Elvins et al. | |
| 6,675,382 B1 | * | 1/2004 | Foster | 717/177 |
| 6,839,744 B1 | * | 1/2005 | Kloba et al. | 709/219 |
| 6,970,849 B1 | * | 11/2005 | DeMello et al. | 705/52 |
| 7,039,177 B1 | * | 5/2006 | Smith et al. | 379/355.03 |

(Continued)

FOREIGN PATENT DOCUMENTS

JP   1998-133881 A   5/1998

(Continued)

OTHER PUBLICATIONS

International Search Report by Korean Intellectual Property Office on Jul. 24, 2006.

(Continued)

*Primary Examiner* — Nick Corsaro
*Assistant Examiner* — Sowmini Nair
(74) *Attorney, Agent, or Firm* — Knobbe, Martens, Olson & Bear LLP

(57) ABSTRACT

The present invention relates to a system and a method of providing content for a mobile communication terminal, and a computer readable medium comprising a program for implementing the method. There is provided a method of: providing content for a mobile communication terminal, storing content organized into sub-content files, wherein the sub-content files comprises at least one of an executable file, a DLL file, and a resource file; generating package list data for the multi files; transmitting the package list data to the mobile communication terminal; and transmitting the sub-content files in the package list data to the mobile communication terminal, wherein a download agent program in the mobile communication terminal checks if the transmission completes. By organizing content into a plurality of sub-content files, it is advantageous to transmit the sub-content files efficiently.

5 Claims, 13 Drawing Sheets

U.S. PATENT DOCUMENTS

| | | | |
|---|---|---|---|
| 7,155,517 B1 * | 12/2006 | Koponen et al. | 709/227 |
| 7,171,477 B2 * | 1/2007 | Hori et al. | 709/227 |
| 7,304,984 B2 * | 12/2007 | Butler et al. | 370/352 |
| 7,363,035 B2 * | 4/2008 | Reilly | 455/432.3 |
| 7,583,801 B2 * | 9/2009 | Terekhova et al. | 380/201 |
| 7,593,686 B1 * | 9/2009 | Knoop | 455/3.04 |
| 7,805,719 B2 * | 9/2010 | O'Neill | 717/168 |
| 2001/0029605 A1 * | 10/2001 | Forbes et al. | 717/11 |
| 2002/0131404 A1 * | 9/2002 | Mehta et al. | 370/352 |
| 2003/0110044 A1 * | 6/2003 | Nix et al. | 705/1 |
| 2003/0195974 A1 * | 10/2003 | Ronning et al. | 709/230 |
| 2004/0054650 A1 | 3/2004 | Chun | |
| 2004/0166834 A1 * | 8/2004 | Omar et al. | 455/414.1 |
| 2004/0194069 A1 * | 9/2004 | Surasinghe | 717/136 |
| 2005/0033728 A1 | 2/2005 | James et al. | |
| 2005/0037740 A1 * | 2/2005 | Smith et al. | 455/414.1 |
| 2005/0043020 A1 * | 2/2005 | Lipsanen et al. | 455/422.1 |
| 2005/0153741 A1 * | 7/2005 | Chen et al. | 455/558 |
| 2005/0282490 A1 | 12/2005 | Nurmi | |
| 2006/0224943 A1 | 10/2006 | Snyder et al. | |

FOREIGN PATENT DOCUMENTS

| | | | |
|---|---|---|---|
| JP | 1998-240602 | | 9/1998 |
| JP | 1999-065828 | A | 3/1999 |
| JP | 2001-273147 | A | 10/2001 |
| JP | 2001-300144 | | 10/2001 |
| JP | 2002-169822 | | 6/2002 |
| JP | 2002-189601 | A | 7/2002 |
| JP | 2002-342290 | A | 11/2002 |
| JP | 2002-540492 | A | 11/2002 |
| JP | 2003-005883 | A | 1/2003 |
| JP | 2003-141419 | A | 5/2003 |
| JP | 2003-162414 | | 6/2003 |
| JP | 2004-030189 | A | 1/2004 |
| JP | 2004-86409 | A | 3/2004 |
| JP | 2004-113490 | A | 4/2004 |
| JP | 2004-512578 | A | 4/2004 |
| JP | 2004-164299 | A | 6/2004 |
| JP | 2005-011148 | | 1/2005 |
| JP | 2005-011218 | A | 1/2005 |
| JP | 2005-100435 | | 4/2005 |
| KR | 2002-0003541 | | 1/2002 |
| KR | 2002-0067248 | | 8/2002 |
| KR | 2003-0030586 | | 4/2003 |
| KR | 10-389093 | | 6/2003 |
| KR | 2003-073855 | | 9/2003 |
| KR | 2004-009097 | | 1/2004 |
| KR | 2004-0032010 | | 4/2004 |
| KR | 2004-093583 | | 11/2004 |
| KR | 2004-0096332 | | 11/2004 |
| KR | 2005-001174 | | 1/2005 |
| KR | 10-2000-0054477 | A | 9/2007 |
| WO | WO 00/33193 | A1 | 6/2000 |
| WO | WO 02/41147 | A1 | 5/2002 |
| WO | WO 2004/111905 | A1 | 12/2004 |

OTHER PUBLICATIONS

Window 2000 Service Pack 1 basic Q&A, Windows 2000 World, Japan, IDG Japan Incorporation, Jan. 1, 2001, vol. 6, No. 1, pp. 259-265.

Japanese Office Action for Japanese Patent application No. 2007-531090 dated Jan. 12, 2010 by Japanese Patent Office.

International Search Report for International Application No. PCT. KR2006/001398 dated Jul. 10, 2006 by Korean Intellectual Property Office.

Notice of Reason for Rejection for Japanese Patent Application No. 2007-534522 dated Sep. 10, 2009 by Japanese Patent Office.

Office Action for U.S. Appl. No. 11/725,229 dated Jan. 8, 2010 by U.S. Patent and Trademark Office.

International Search Report for International Application No. PCT/KR2006/001355 dated Jul. 21, 2006 by Korean Intellectual Property Office.

Japanese Office Action for Japanese Application No. 2007-533409 dated Dec. 14, 2009 by Japanese Patent Office.

Extended European Search Report for European Patent Application No. 06 74 7364 dated Jun. 11, 2010 by European Patent Office.

Office Action for U.S. Appl. No. 11/725,229 dated Jul. 7, 2010.

European Search Report dated Jul. 29, 2010.

Japanese Office Action dated Oct. 12, 2010.

Lunux magazine, JP, Feb. 1, 2005, vol. 7, pp. 148-153.

Directions on Microsoft. JP, Mar. 16, 2005, vol. 1, pp. 39-48.

Notice of Reason for Rejection for Japanese patent application No. 2007-531090 dated Jul. 16, 2009.

* cited by examiner

FIG. 5

| EXECUTABLE FILE ID | ACTUAL FILE NAME | VERSION DATA | SIZE | BILLING DATA |
|---|---|---|---|---|
| | | | | |

FIG. 6

| |
|---|
| DLL FILE ID |
| ACTUAL FILE NAME |
| VERSION DATA |
| SIZE |
| BILLING DATA |
| ⋮ |
| DLL FILE ID |
| ACTUAL FILE NAME |
| VERSION DATA |
| SIZE |
| BILLING DATA |

FIG. 7

| RES FILE ID |
|---|
| ACTUAL FILE NAME |
| VERSION DATA |
| SIZE |
| BILLING DATA |
| ⋮ |
| RES FILE ID |
| ACTUAL FILE NAME |
| VERSION DATA |
| SIZE |
| BILLING DATA |

FIG. 8

| ITEM FILE ID |
|---|
| ACTUAL FILE NAME |
| VERSION DATA |
| SIZE |
| BILLING DATA |
| ⋮ |
| ITEM FILE ID |
| ACTUAL FILE NAME |
| VERSION DATA |
| SIZE |
| BILLING DATA |

CONTENT MASTER ID/EXECUTABLE FILE

CONTENT MASTER ID/ICON FILE

CONTENT MASTER ID/CONTNET DATA FILE

CONTENT MASTER ID/D/DLL FILE

CONTENT MASTER ID/P/Resource FILE(OR ITEM FILE)

SYSTEM AND METHOD OF PROVIDING CONTENTS FOR MOBILE COMMUNICATION TERMINAL

RELATED APPLICATIONS

This application is a continuation application, and claims the benefit under 35 U.S.C. §§120 and 365 of PCT Application No. PCT/KR2006/001369, filed on Apr. 13, 2006, which is hereby incorporated by reference in its entirety.

BACKGROUND OF THE INVENTION

1. Field of Invention

The present invention relates to a system and a method of providing content for a mobile communication terminal, particularly, a method of efficiently providing large-size content by organizing content to be downloaded to a mobile communication terminal into a plurality of sub-content files and for managing efficiently the large size content in the mobile communication terminal.

2. Description of the Related Technology

Recently, the rapid development of Internet is enhancing access to various content data through the Internet.

The term "content" indicates various information or their contents, both are provided over the Internet, such as text, music, games, movies, and executable program of reproducing the above-mentioned content on a user terminal.

The content was downloaded through the landline Internet and played on desktop PCs or notebook computers in the past, however, since cellular phones or personal digital assistants (PDA) become popular nowadays, the needs to use content over mobile communication terminals increase more and more.

Currently, it becomes possible to provide several tens of mega-bytes to several giga-bytes content with ongoing advances in the technology of massive multimedia data transmission over the landline Internet and rapid performances of desktop PCs or notebook computers. However, in providing content to a mobile communication terminal, it is the fact that small-size content can be sent to the mobile communication terminal due to the limited memory volume, performance of the mobile communication terminal, and instability of wireless network.

Since small-size content used to be downloaded to the mobile communication terminal in the past, it was general to organize content for the mobile communication terminal as one file.

For example, in case of providing game content, execution data for using content and resource data for presenting characters or backgrounds, etc. were put into one file and then provided.

Recently, it becomes possible to expand memory capacity of the mobile communication terminal with external memory devices and to improve its processing performance, so that it allows to process large-size content in the mobile communication terminal. It is, however, still the fact that large-size content is being provided in one file.

But, there may be the following shortcomings when providing content in one file to the mobile communication terminal.

First, in case of large-size content, there may be various patch files after the first development of content, and when content is provided in one file, whole content has to be newly downloaded for downloading a relatively small-size patch file.

Second, in case of downloading whole content to download a small size patch files, it causes increased communication costs due to high volume of packet transmission through the network.

Third, in case of large size content, there may be an extension pack for expanding function. In this case, even if there are many consistent components between a basic pack of the content and the extension pack, whole extension pack has to be newly downloaded.

In addition, reproduction programs such as VOD player, DMB player, and MP3 player for mobile communication terminals have been included in an operating system when manufacturing a mobile communication terminal due to the performance of the terminal, however, it is possible to provide patch file for revising errors or extension pack for upgrading these programs through updating the terminal OS binary. But, since the performance of the terminal is increasing continuously and the limitation on the terminal storage is disappearing with external memory devices, the possibility of downloading these kinds of programs used to be provided with the terminal OS increases.

But, if this execution program is also downloaded in one file to the mobile communication terminal, in case of downloading small size patch files or extension packs including lots of components that are already included in the basic pack, there are still shortcomings that whole content has to be downloaded.

In addition, content for the mobile communication terminal has been provided in one file, and this file was stored in the predetermined address region in memory of the mobile communication terminal as one file without any specific directory.

Recently, it becomes possible to provide large size content due to the increased performance of the mobile communication terminal and increased memory capacity, however, large size content is still provided to the mobile communication terminal in one file and stored in the predetermined storage region without designating any specific directory.

It is possible there are various patch files if the size of content becomes larger, however, whole content had to be downloaded for the small size patch file, and accordingly, the mobile communication terminal must reserve large size of memory volume when downloading content.

Also, no extension pack was provided for large size content that was already installed on the mobile communication terminal, or even if there was an extension pack, this was recognized as a different file because content was organized in one file, so that the memory volume was limited because the extension pack was stored in another storage region different from the region where the basic pack was stored.

SUMMARY OF CERTAIN INVENTIVE ASPECTS

To overcome the aforementioned shortcomings, a method of efficiently providing content for a mobile communication terminal by organizing content into sub-content files and a storage medium containing a program for performing the method are disclosed.

Another object of the invention is disclosing a mobile communication terminal capable to manage large size content efficiently and a storage medium containing a program for implementing such a management of the large size content.

To achieve aforementioned objects, according to the first embodiment, there is provided a method of providing content for a mobile communication terminal, comprising: storing content that is organized into sub-content files, wherein the sub-content files comprises at least one of an executable file, a DLL file and a resource file; generating package list data for the sub-content files; transmitting the package list data to the mobile communication terminal; and transmitting the sub-content files in the package list data to the mobile communication terminal, wherein a download agent program in the mobile communication terminal checks if the transmission of the sub-content files in the package list data completes.

According to another aspect of the invention, there is provided a method of providing an individual file to the mobile communication system including a content server of providing content to the mobile communication terminal, comprising: receiving package list data for content stored in the mobile communication terminal, wherein the content is organized into a plurality of individual files and the package list data comprises a content master ID and individual file data; comparing the individual file data in the received package list with the individual file data for the content stored in the content server; and transmitting one of individual files stored in the content server having different individual file data from the file in the received package list data to the mobile communication terminal.

Also, according to still another aspect of the invention, there is provided a storage medium containing a program consisting of instructions executable by a digital processing device of receiving individual files of content for a mobile communication terminal from a content server, said storage medium comprising: receiving latest package list data corresponding to the content stored in the mobile communication terminal from the content server, wherein the content is organized into a plurality of individual files comprising at least one of an executable file, a DLL file and a resource file, and the latest package list data comprises a content master ID, content unified version data, and individual file data; comparing individual file data in the latest package list data with individual file data for the content stored in the mobile communication terminal; and requesting for download of files among a plurality of individual files in the latest package list data having different individual file data from the file in the mobile communication terminal to the content server.

Also, according to still another aspect of the invention, there is provided a storage medium containing a program consisting of instructions executable by a digital processing device of receiving extension pack files corresponding to basic packs of content pre-stored in a mobile communication terminal from a content server, said storage medium comprising: receiving extension pack package list data corresponding to the extension pack content from the content server, wherein the content is organized into a plurality of individual files comprising at least one of an executable file, a DLL file and a resource file, and the extension pack package list data comprises a content master ID, content unified version data and individual file data; comparing individual file data in the extension pack package list data with individual file data for the content pre-stored in the mobile communication terminal; and requesting for download of files among a plurality of individual files in the extension pack package list data having different individual file data from the file corresponding to the basic packs.

In addition, according to the second embodiment, there is provided a storage medium containing a program consisting of instructions executable by a digital processing device of managing large size content for a mobile communication terminal to be downloaded from a content server, said storage medium comprising: (a) receiving a package list for sub-content files consisting content from the content server, wherein the sub-content files comprises at least one of executable file, DLL file and resource, and the package list comprises a content master ID; (b) receiving the sub-content files; and (c) designating the content master ID as a higher directory and storing each of the received sub-content files in lower directories of the content master ID, respectively.

Also, according to another aspect of the invention, there is provided a mobile communication terminal of managing large size content, comprising: a downloading managing module, receiving a package list of sub-content files consisting content and sub-content files from a content server and storing the sub-content files based on a directory structure, wherein the sub-content files comprises at least one of executable file, DLL file and resource, and the package list comprises a content master ID; and a memory volume checking module, checking whether or not memory volume enough for the size of files to be transmitted by the content server is reserved according to the existence of the content master ID.

According to still another aspect, it becomes possible to transmit patch files of large size content individually by organizing the content into sub-content files and managing the sub-content files with a package list.

Also, according to still another aspect, it becomes possible to recover an essential file for execution, which a user deleted by mistake, through a patch process of content or request for re-downloading content, and to transmit both a game application that needs to be compiled and a resource file that does not need to be compiled at the same time.

According to still another aspect, it becomes possible to manage large size content efficiently because the large size content that is organized into sub-content files including files that can be shared commonly is stored in the predetermined directory structure in the mobile communication terminal.

Also, according to still another aspect, since a reception icon is displayed and the execution of content that download of all latest patch files is not completed is prohibited during download of patch files, it is possible to use the mobile communication terminal stably.

Also, according to still another aspect, during download of patch files, if download of one patch file is completed, then the file that has same individual ID among the sub-content files is updated with the downloaded patch file, so that there is no need to reserve large memory volume.

BRIEF DESCRIPTION OF DRAWINGS

FIG. 5 shows configuration data of an executable file according to an embodiment;

FIG. 6 shows configuration data of a DLL file according to an embodiment;

FIG. 7 shows configuration data of a resource file according to an embodiment;

FIG. 8 shows configuration data of an item file according to an embodiment;

DETAILED DESCRIPTION OF CERTAIN INVENTIVE EMBODIMENTS

The aforementioned objects, features and advantages will be more apparent from the following description in relation to accompanying drawings. In numbering elements in each drawing, same elements appearing on different drawings will have same reference number as possible.

Hereinafter, the embodiments of method of providing content for a mobile communication terminal and the storage medium thereof will be described in detail with reference to accompanying drawings.

Figure 1:
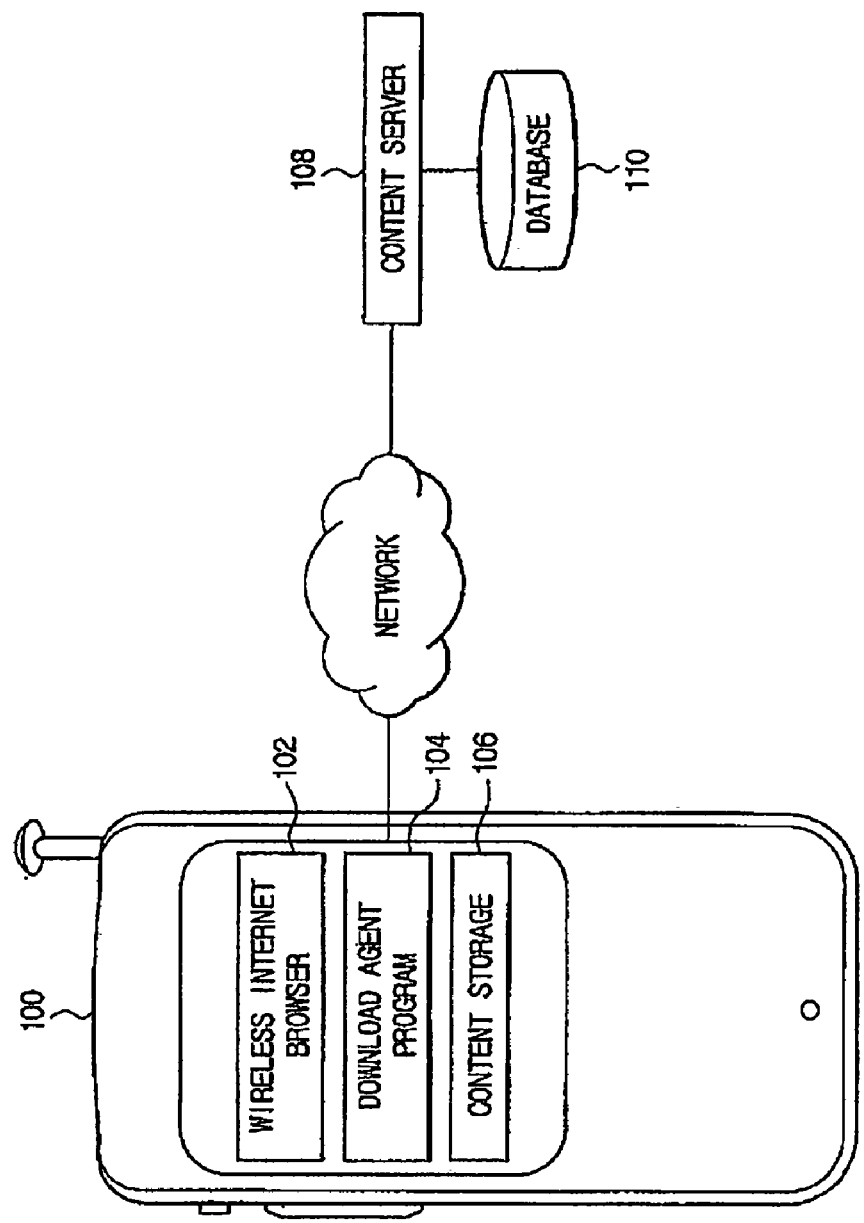
FIG. 1 shows a content providing system according to an embodiment.

FIG. 1 shows a content providing system according to an embodiment.

As shown in FIG. 1, the content providing system according to an embodiment may comprise a mobile communication terminal 100 and a content server 108. The mobile communication terminal 100 and the content server 108 may be coupled to each other via network.

Here, the network may be a wireless network including BTS (Base Transceiver Station), BSC (Base Station Controller) and PDSN (Packet Data Serving Node).

The mobile communication terminal 100 can receive various kinds of content after accessing wirelessly to the content server 108 by using aforementioned network elements.

Generally, "content" usually indicates music data or movie data being provided over network such as Internet. However, in this specification, content further comprises an executable file of reproducing the above-mentioned data and a link program (e.g., DLL program), so that content in embodiments will indicate all data transmitted through network.

The mobile communication terminal 100 can be one of cellular phone, MBS (Mobile Broadcast System), and so on.

According to an embodiment, the mobile communication terminal 100 comprises a wireless Internet browser 102, a download agent program 104 and a content storage 106.

The wireless Internet browser 102 for reproducing a content list or an item list being provided by the content server 108 can be one of WAP (Wireless Application Protocol) browser, ME (Mobile Explorer) and so on.

The download agent program 104 checks if the download of whole content is performed in case of downloading content from the content server 108.

According to an embodiment, the content server 108 organizes content into several files (hereinafter, "sub-content files" or "plural individual files") such as executable file (EXE file), link file, resource file (RES), item file, etc., rather than one file and stores them. And, if a user requests for download, then the content server 108 generates a package list comprising information of the sub-content files and transmits the package list with sub-content files to the mobile communication terminal 100.

The executable file is continuously loaded on memory while certain content is reproducing.

The link file such as DLL (Dynamic Library Link) file is linked to the executable file that uses the link file during execution rather than compiled with the executable file that is loaded onto memory of the mobile communication terminal 100. The link file is for efficient use of memory, reuse of developed software, development for structural software, etc.

In addition, the resource file is for example a file for game graphic in case of game content, and a skin file in case of reproducing program such as VOD player.

The item file is for extending function of resource. For example, this is an extension file of cars or tracks in racing game, or a file for skin change or skin extension in VOD player.

The package list data comprises a content master ID, unified version data, ID and version data of the executable file, and the number, ID and version data of DLL, resource (RES) and item file included in the content.

According to an embodiment, the download agent program 104 receives package list data from the content server 108 and stores it. Also, in case of content transmission from the content server 108, the download agent program checks whether transmissions of each of sub-content files, which is included in the package list, are finished.

In addition, according to an embodiment, if there is a patch file for already-downloaded content, the download agent program 104 of the mobile communication terminal 100 transmits package list data of already-downloaded content to the content server 108. The content server 108 searches a file from the files currently stored in itself having different size or individual ID from the file in the mobile communication terminal 100 by using the package list data being transmitted from the mobile communication terminal 100, and then transmits the searched file to the mobile communication terminal 100.

For example, if size or individual ID is not identical, it requires patching or recovering a file that was deleted in the mobile communication terminal 100. In this case, the content server 108 transmits the required file to the mobile communication terminal 100 by using size data of individual file or individual version data.

According to another embodiment, it is possible for the mobile communication terminal 100 to make a decision whether or not a patch file is needed. At this, the download agent program 104 receives the latest package list of content from the content server 108, and compares data of individual files being included in the latest package list with data of individual files being included in the mobile communication terminal 100. After comparing, the download agent program 104 requests the download of files having different individual file data to the content server 108.

Here, different individual file data means, for example, that two files have same ID but different size or individual version. In this case, as it will be the patch file or recovery of deleted file, the download agent program 104 requests this to the content server 108.

As described above, according to an embodiment, large size content is organized into sub-content files, and a providing process of patch files, etc., by using package list data is performed. Thus, it may eliminate download of whole content for small size patch files or deleted files.

The content storage 106 stores all kinds of content downloaded from the content server 108. The content storage 106 may be an internal memory of the mobile communication terminal 100 or an external memory for storing large-size content.

Although embodiments described the download of content via wireless network, the invention is not thus limited, and downloading small size patch files via wireless network after downloading content on a user PC via landline network and then moving the downloaded content to the mobile communication terminal 100 may be included in the scope of the invention.

Database 110 is coupled to the content server 100 according to an embodiment, and database 110 stores user data, sub-content files that consist content, package list data and so on.

Figure 2:
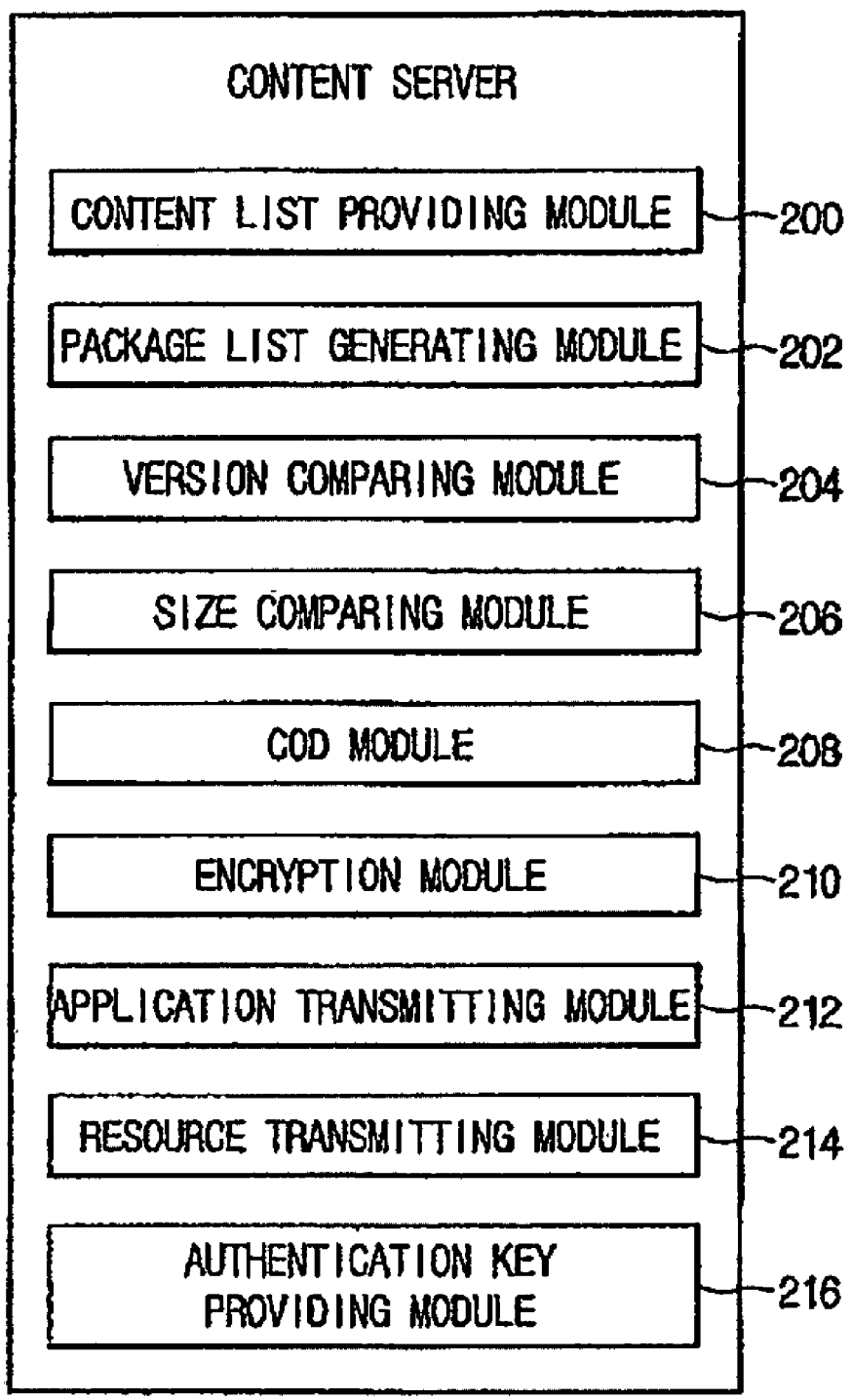
FIG. 2 shows modules consisting of the content server according to an embodiment.

FIG. 2 shows modules consisting of the content server according to an embodiment.

As shown in FIG. 2, the content server 108 according to an embodiment comprises a content list providing module 200, a package list generating module 202, a version comparing module 204, a size comparing module 206, a COD module 208, an encryption module 210, an application transmitting module 212, a resource transmitting module 214, and an authentication key providing module 216.

The content list providing module 200 provides a content list and item list to the mobile communication terminal 100 connected to the content server 108.

The package list generating module 202 generates the package list for sub-content files that consist certain content.

The content server 108 according to an embodiment organizes content to be downloaded to the mobile communication terminal 100 into sub-content files, and generates a package list for these sub-content files.

Figures 3, 4:
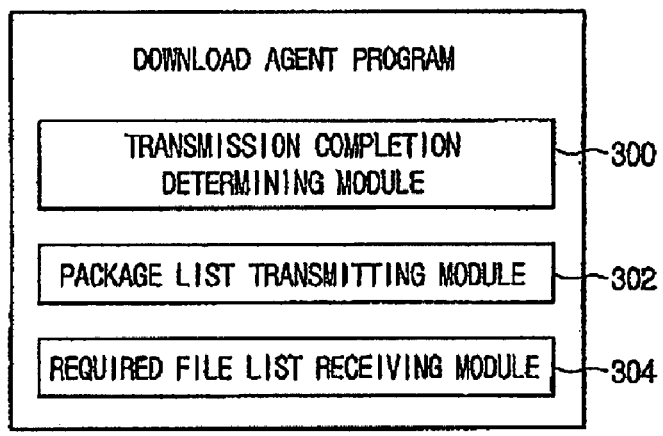
FIG. 3 shows modules consisting of the download agent program according to an embodiment.
FIG. 4 shows package list data according to an embodiment.

FIG. 4 shows the package list data according to an embodiment. As shown in FIG. 4, package list data according to an embodiment comprises a content master ID, a content unified version, the number of executable files, executable file configuration data, the number of DLL files, DLL file configuration data, the number of resource files, resource file configuration data, the number of item files, and item file configuration data, etc.

The content unified version indicates that certain content is a basic package or an extension package and shows a patch version status.

According to an embodiment, the number of executable file may be one. Configuration data of executable file may comprise, as shown in FIG. 5, executable file ID, actual file name, version data, size and billing data for one executable file.

Content unified version data can be represented in the form of major/middle/minor such as 1.x.x or 2.x.x. The major number may be an identification number for identifying basic package or extension package, and middle and minor numbers may be for identifying patch.

In addition, the number of DLL files, resource files and item files may vary with the kind of content. Each configuration data as shown in FIGS. 6 to 8 comprises ID, version data, size and billing data of each file.

In addition, the item file is for extending resources and does not need to be included in the first download of content.

The package list generating module 202 according to an embodiment generates packet list having data of sub-content files on receiving the first content request of user and sends it to the content list providing module 200. The content list providing module 200 transmits the package list data to the mobile communication terminal 100.

Although the package list is generated after receiving content transmission request of user, it is just an example, and it is also possible to generate the package list beforehand and transmit it on receiving user's request.

Then, when the downloading of sub-content files starts, the download agent program 104 of the mobile communication terminal 100 checks if all sub-content files included in the package list that was already provided is transmitted.

In addition, the package generating module 202 generates the latest package list not only in the first downloading of specific content but also in downloading of patch file, etc., for content that was already stored in the mobile communication terminal 100.

According to an embodiment, the content server 108 comprises the version comparing module 204. The version comparing module 204 compares unified version of content in the mobile communication terminal 100 with unified version of content in the content server 108 to make a decision whether or not a patch file is needed.

In addition, the individual file comparing module 206 compares data of individual files in the package list transmitted from the mobile communication terminal 100 with data of individual files in the package stored in the content server 108.

As described above, the individual file according to an embodiment comprises individual ID, size, version data and so on. The individual file comparing module 206 compares size or individual version data of two files having same individual ID, each is stored in the content server 108 and the mobile communication terminal 100.

Through this, if individual file data is different, downloading of patch file or deleted file to the mobile communication terminal 100 can be achieved.

Although an embodiment uses size data or individual version data, the invention is not thus limited, and the individual file comparing process may be performed by using various data relating to individual file.

According to an embodiment, the content server 108 transmits a required file list of content to the mobile communication terminal 100.

Here, the required file list indicates a list of files to be downloaded to the mobile communication terminal 100, which is identified through the comparison of individual file data.

After transmitting the required file list, the transmission process of the required file (including patch file or recovery file) is performed, and the download agent program 104 of the mobile communication terminal 100 checks whether or not the transmissions of all required file are finished.

Thus, since the user can download individual files to be patched or recovered among sub-content files that consist one content, the wireless network access time will decrease and, as a result, communication expense will be reduced.

COD module 208 compiles executable files and DLL files needed to be compiled among sub-content files.

The COD module 208 is a key component of WIPI (Wireless Internet Platform for Interoperability) for the wireless Internet platform standard under discussion.

According to an embodiment, executable files or DLL files among sub-content files consisting of content need to be complied, and the COD module 208 compiles such files.

The encryption module 210 encodes each sub-content file if necessary.

The executable files and DLL files are compiled and then encoded in the COD module 208 as described above, and the resource files and item files are encoded without being compiled.

Also, according to an embodiment, each of DLL files, resource files and item files can be organized into plural files, and the encoding process can be applied to each file individually, if necessary.

The game application transmitting module 212 transmits executable files and DLL files among sub-content files to the mobile communication terminal 100. Namely, the game application transmitting module 212 transmits the compiled files such as executable files and DLL files that the COD module 208 compiled.

The resource transmitting module 214 transmits resource files and item files, both do not need to be compiled, to the mobile communication terminal 100.

The item file is for extension of resource, and as described above, includes graphic expression extension of game, additional skin of each player, etc. The item file is not an essential file to be downloaded at the first content download.

When carrier provides content in the past, whole files were compiled into one file and then the compiled file was transmitted. But, in this case, carrier who operates the content server could not provide files that were not compiled at one time.

According to an embodiment, since it becomes possible to transmit each of compiled file and resource file that is not needed to compile individually, it allows for carrier to transmit sub-content files at one time.

The authentication key providing module 216 transmits an authentication key for decoding the encoded files for content protection to the mobile communication terminal 100.

In the above, although it was described that each module in the content server 108 provides content according to the user's request, it is just an example, and each module can be performed by separate servers.

FIG. 3 shows modules consisting of the download agent program according to the embodiment.

As shown in FIG. 3, the download agent program according to an embodiment comprises a transmission completion determining module 300, a package list transmitting module 302, and a required file list receiving module 304.

The transmission completion determining module 300 checks that download of all sub-content files included in the package list being sent from the content server 108 is completed on the first download of content.

When transmitting sub-content files that consist one content, the transmission completion determining module 300 checks the transmission completion of each file by using size of the corresponding file that was already provided. The transmission completion determining module 300 can send a transmission completion response signal to the content server 108 when transmission of individual file completes, and a transmission completion response signal for entire files when transmission of all sub-content files completes.

But, this is just an example, and it is possible to send the response signal when the transmission of all sub-content files completes.

In addition, the transmission completion determining module 300 checks the transmission completion when downloading required files.

As described above, according to one embodiment, if patch file or recovery file for content that was already downloaded to the mobile communication terminal 100 is required, the content server 108 generates a required file list and transmits it. At this time, the transmission completion determining module 300 checks the transmission of all individual files completes by using the required file list.

If there is an inquiry request for patch file of specific content from the mobile communication terminal 100, the content server 108 needs package list data for the specific content that is stored in the mobile communication terminal 100 to compare individual file data. For this, the package list transmitting module 302 transmits the package list data that is stored in the mobile communication terminal 100 to the content server 108.

The required file list receiving module 304 receives a required file list that the content server 108 generates by comparing individual file data in the package list transmitted from the mobile communication terminal 100 with individual file data that is currently stored in the content server 108.

Figure 9:
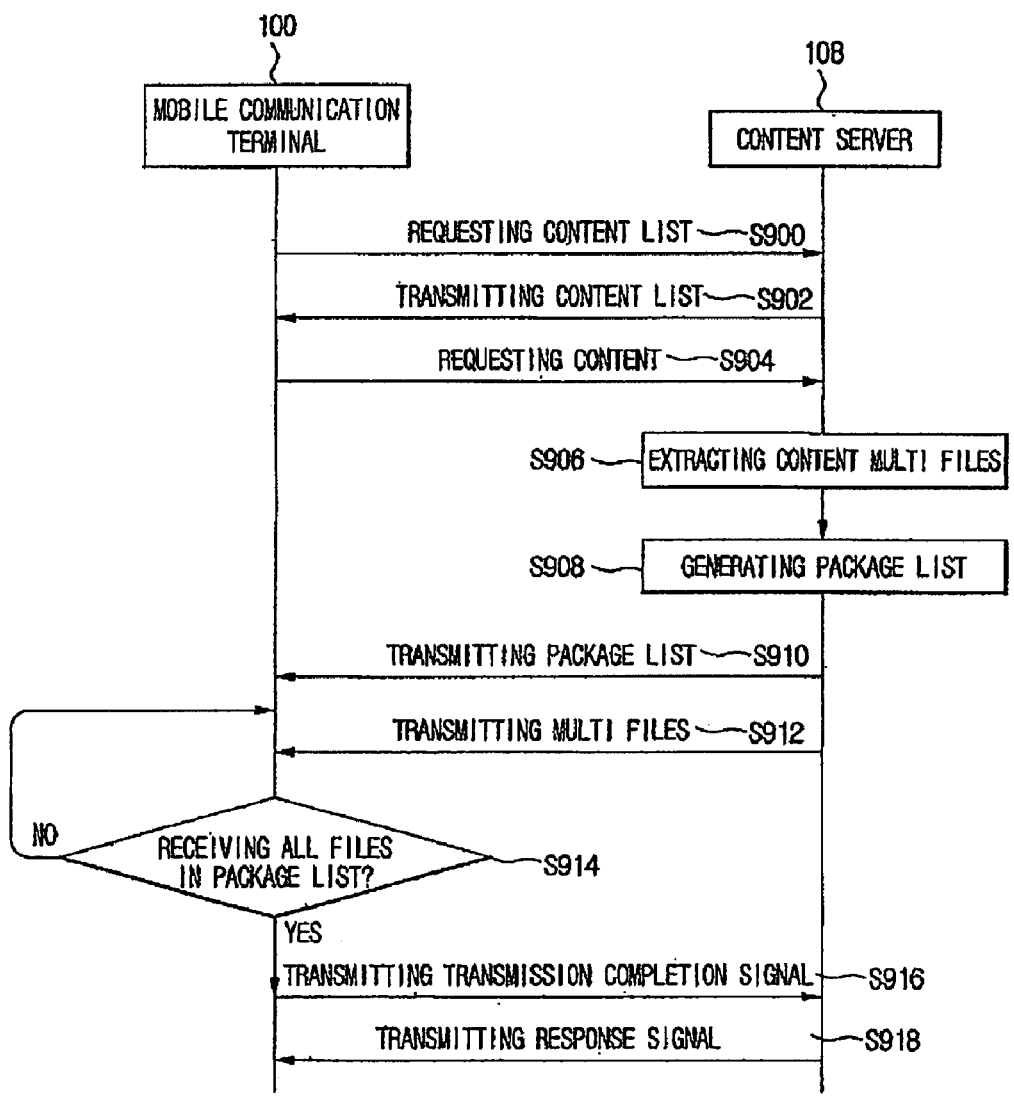
FIG. 9 is a flowchart showing the content download according to an embodiment.

FIG. 9 is a flowchart showing the content download according to an embodiment.

FIG. 9 shows the procedure for the first downloading of content, and this procedure can be applied to not only the download of basic pack of content but also the download of extension pack.

Referring to FIG. 9, the mobile communication terminal 100 requests a content list to the content server 108 (S900).

The content server 108 transmits the content list as a response to the mobile communication terminal 100, and the wireless Internet browser 102 of the mobile communication terminal 100 receives the content list and displays (S902).

When the user selects desired content to be downloaded, the mobile communication terminal 100 requests the download of the selected content to the content server 108 (S904).

Then, the content server 108 extracts sub-content files that consist the requested content from database 110 (S906) and generates a package list (S908).

As described above, the package list comprises content master ID, unified version data, each number and configuration data of executable files, DLL files and resource files.

The content server 108 transmits the generated package list data to the mobile communication terminal 100 (S910), and then transmits sub-content files that consist one content (S912).

The download agent program 104 of the mobile communication terminal 100 checks whether or not transmission of all sub-content files completes by using the package list data transmitted from the content server (S914).

If transmission of all sub-content files completes, the mobile communication terminal 100 transmits a transmission completion signal to the content server 108 (S916), and the content server 108 transmits a response signal to the mobile communication terminal 100 (S918).

Figure 10:
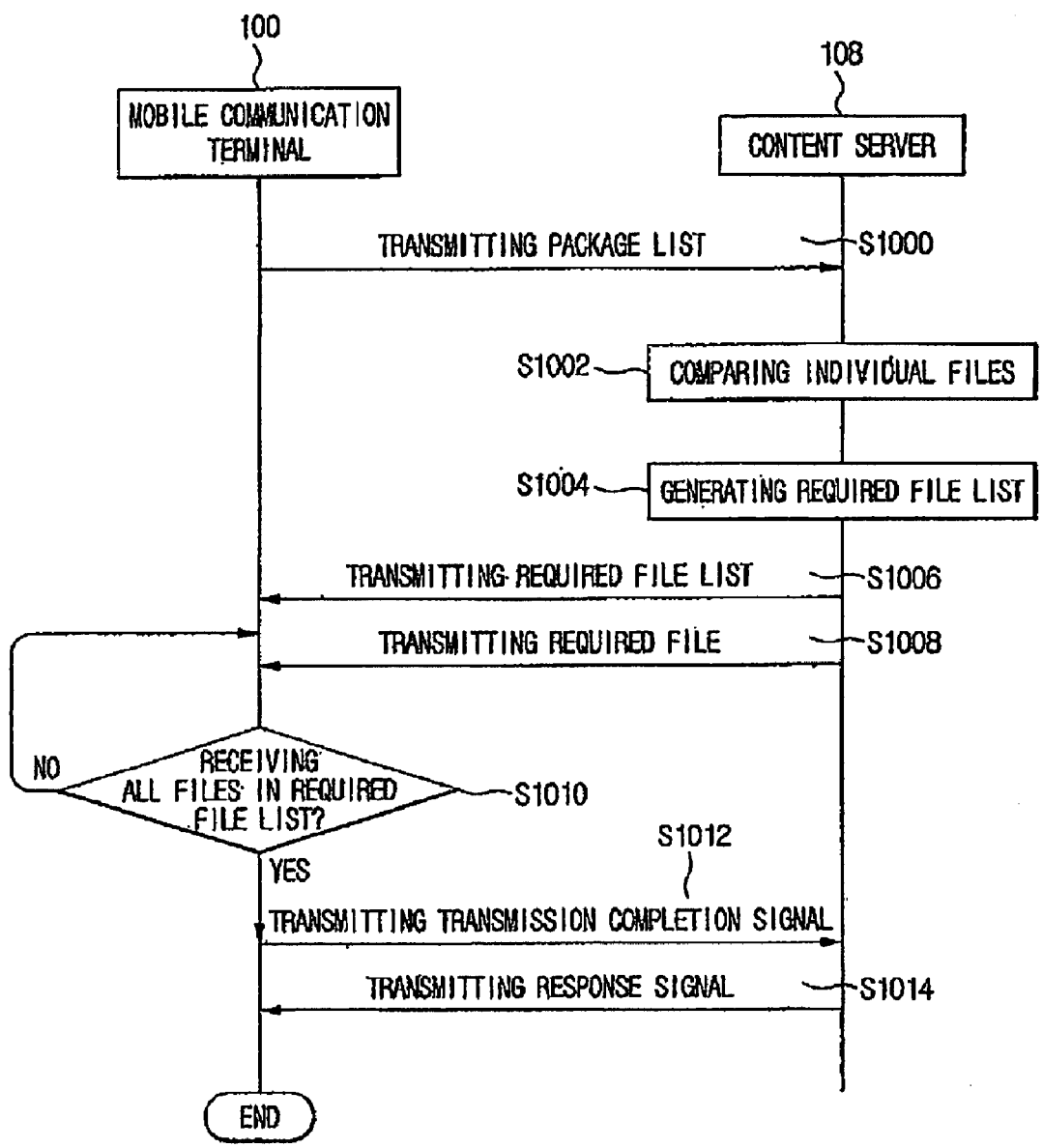
FIG. 10 is a flowchart of downloading the required file according to an embodiment.

FIG. 10 is a flowchart of downloading the required file according to an embodiment.

FIG. 10 shows the procedure of downloading individual files after the first downloading of content, and referring to FIG. 10, the mobile communication terminal 100 accesses to the content server 108 and transmits package list data stored in the mobile communication terminal (S1000).

According to an embodiment, the package list data may comprise content master ID, IDs of each individual file, individual file size, version data and so on.

The content server 108 receives a package list from the mobile communication terminal 100, and compares individual file data stored in the content server 108 with individual file data in the received package list (S1002).

The content server 108 generates a required file list indicating files having different individual file data (S1004).

As described above, the required file list means a list of files, i.e., patch files and recovery files that have same individual ID but different size or individual version.

The content server 108 transmits the required file list to the mobile communication terminal 100 (S1006), and then transmits individual files included in the required file list (S1008).

The mobile communication terminal 100 checks that transmission of all files included in the required file list completes (S1010).

If the transmission of all patch files completes, the mobile communication terminal 100 transmits a file transmission completion signal to the content server 108 (S712), and the procedure of downloading individual files finishes when the content server 108 transmits a response signal thereto (S1014).

As this, according to an embodiment, it becomes possible to download the required file by organizing content into sub-content files and comparing individual file data.

In addition, according to an embodiment, the required file download procedure may be performed by the download agent program 104 that automatically accesses to the content server 104 to check if there is patch files when downloading content according to the predetermined method, or by an individual program, the target of patch and executable on the mobile communication terminal that calls a download agent program through API, or by a re-download request from the user.

In addition, although an embodiment described the procedure of downloading required files or recovery files, the invention is not thus limited, and it is also possible to selectively transmit files that are added to the extension pack by the aforementioned version comparison and size comparison process during the procedure of downloading the extension pack corresponding to the basic pack that is already stored in the mobile communication terminal 100.

Figure 11:
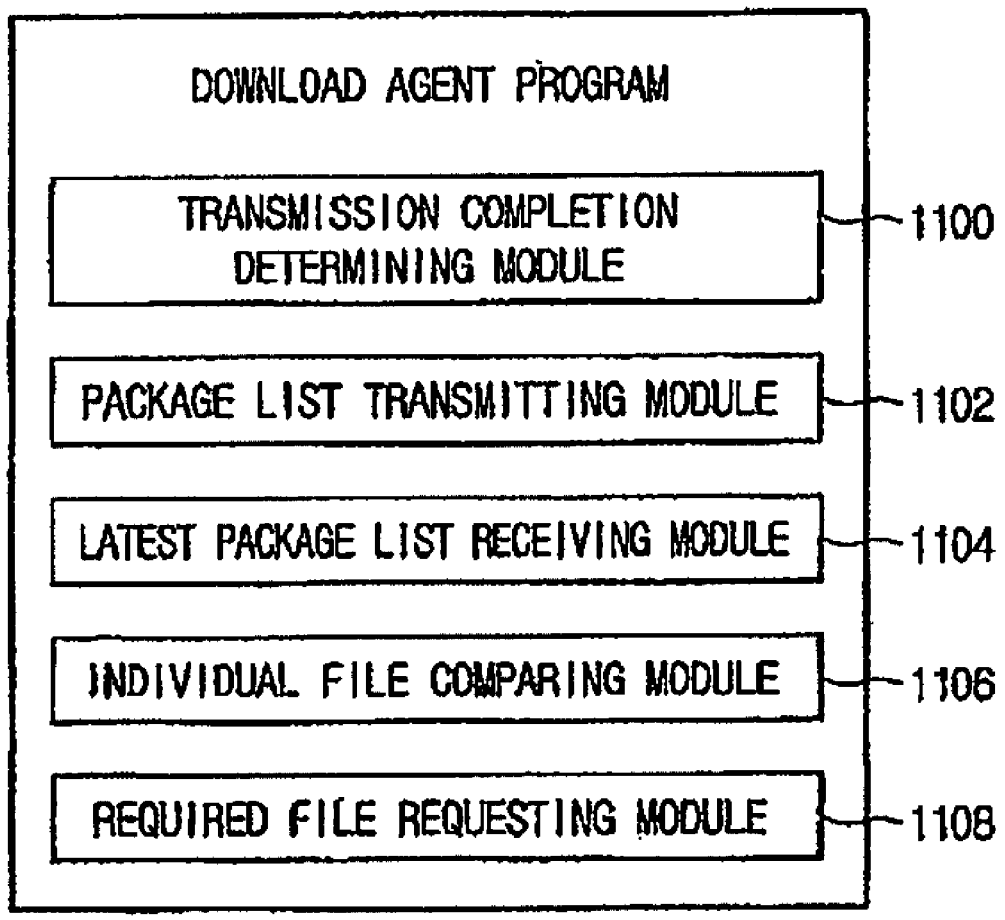
FIG. 11 shows modules consisting of the download agent program according to another embodiment.

FIG. 11 shows modules consisting of the download agent program according to another embodiment.

According to another embodiment, when downloading the required file, the comparison process of individual file data is performed by the mobile communication terminal 100.

For this, as shown in FIG. 11, the download agent program according to an embodiment may comprise a transmission completion determining module 1100, a package list transmitting module 1102, a latest package list receiving module 1104, an individual file comparing module 1106, and a required file requesting module 1108.

Since the transmission completion determining module 1100 is same to the one that was already described in FIG. 3, description about this will be omitted here.

The package list transmitting module 1102 is same to the one that was already described in FIG. 3, however, the process of selecting the required file is performed by the mobile communication terminal 100 in another embodiment.

It is not necessary for the package list data to include all data of sub-content files, and it is possible to include content mast ID, which is for the content server 108 to identify content that the mobile communication terminal 100 requests.

When receiving the package list including the content mast ID from the mobile communication terminal 100, the content server 108 generates the latest package list corresponding to the content master ID and transmits it to the mobile communication terminal 100. At this time, the latest package list receiving module 1104 receives the latest package list from the content server 108.

The individual file comparing module 1106 compares data of individual files in the latest package list being transmitted from the content server 108 with data of individual files in the mobile communication terminal 100.

As described above, comparison of individual files is to compare size or individual version data of two files having same individual ID, however, it is not limited to these data.

Through the individual file comparing process, the required file to be downloaded from the content server 108 can be identified, and the required file requesting module 1108 requests the download of the required file to the content server 108.

Figure 12:
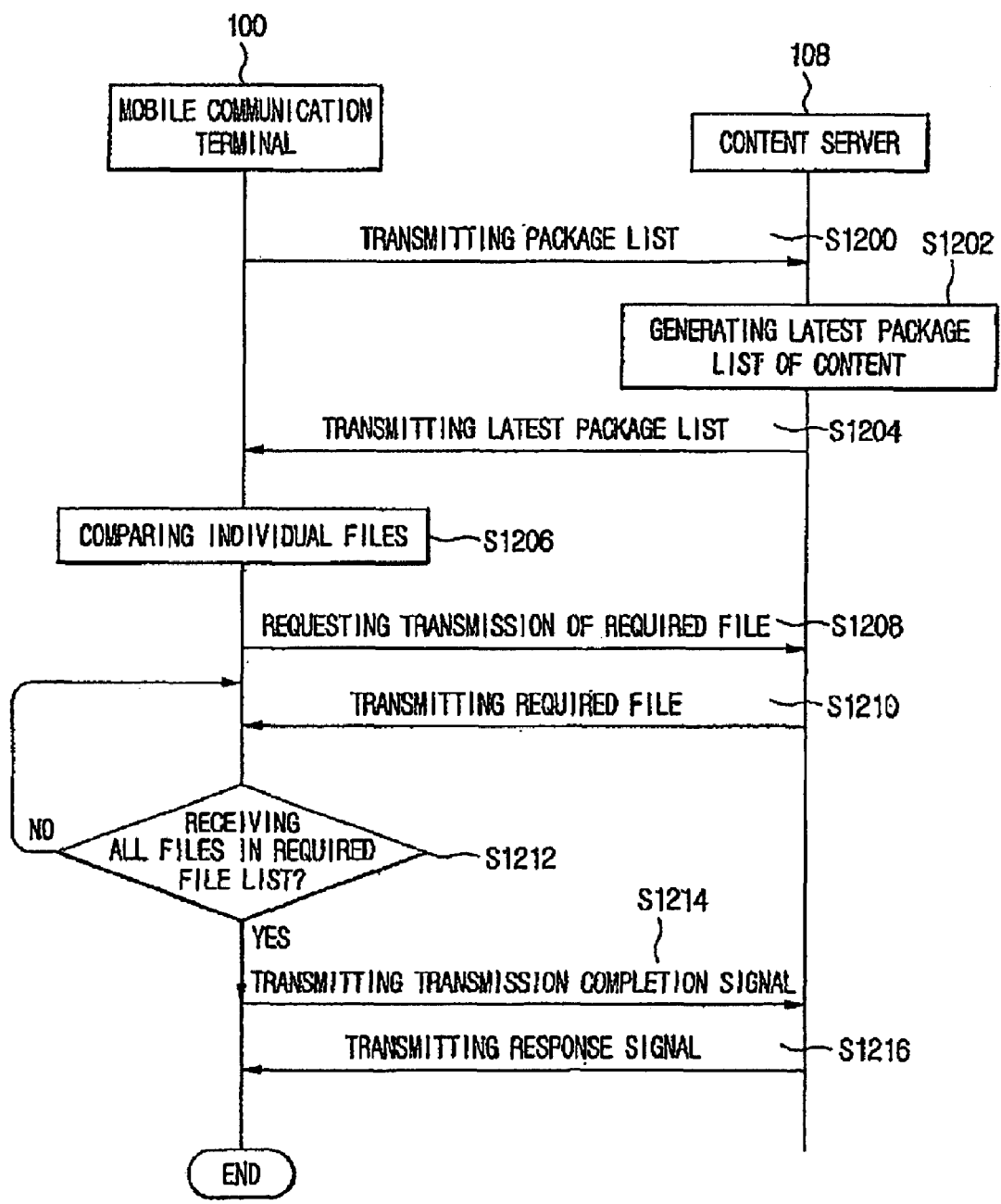
FIG. 12 is a flowchart of required file download procedure according to another embodiment.

FIG. 12 is a flowchart of a required file download procedure according to another embodiment.

Referring to FIG. 12, the mobile communication terminal 100 extracts a package list including the content master ID and transmits it to the content server 108 (S1200).

The package list transmission process can be performed by an automatic request of the download agent program if content is executed in the mobile communication terminal 100. But, it also can be performed by an executed content request for the existence of patch files by calling API, or by a content re-download request of the user.

After identifying the content master ID, the content server 108 generates the latest package list by extracting sub-content files corresponding to the content master ID (S1202). The content server 108 transmits the latest package list to the mobile communication terminal 100 (S1204).

The mobile communication terminal 100 compares data of individual files in the latest package list with data of individual files in the mobile communication terminal 100 (S1206).

At this time, since individual files having different data are the file to be downloaded from the content server 108, the mobile communication terminal 100 requests download of the file to the content server 108 (S1208), and the content server 108 transmits the corresponding patch file as a response thereto (S1210).

The mobile communication terminal 100 checks whether or not transmission of all required file completes by using the latest package list (S1212), and if completes, then transmits a patch file transmission completion signal to the content server 108 (S1214).

When the content server 108 transmits a response signal for the patch file transmission completion signal, the download of patch file finishes (S1216).

Figure 13:
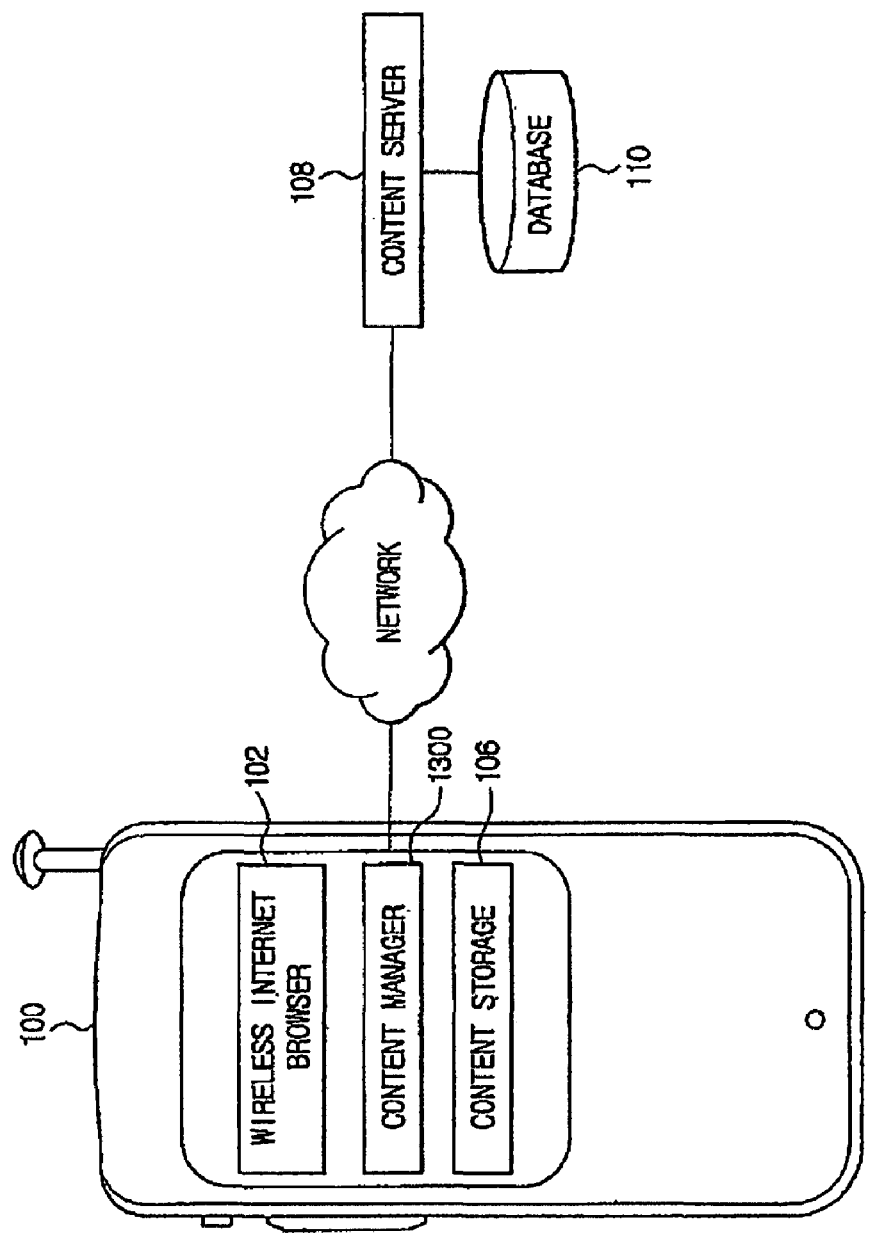
FIG. 13 shows the content providing system according to an embodiment.

FIG. 13 shows the content providing system according to an embodiment.

When comparing FIG. 13 with FIG. 1, since the composition of the mobile communication terminal 100 is the same, excepting comprising a content manager 1300, description on the other components will be omitted.

As described above, the mobile communication terminal 100 according to an embodiment receives package list data and corresponding sub-content files from the content server 108.

The package list data, as shown in FIG. 4, may comprise content master ID, unified version data, ID and size of executable file, and the number, ID and size of DLL files, resource files and item files.

Here, the content master ID is an identifier for the content server 108 or the mobile communication terminal 100 to identify content. The content unified version indicates that certain content is basic package or extension package and shows a patch version status.

The content unified version data according to an embodiment can be represented in the form of major/middle/minor such as 1.x.x or 2.x.x. The major number is an identification number for identifying basic package or extension package. Middle and minor numbers are for identifying patch.

In addition, the number of DLL files, resource files and item files may vary with the kind of content. And each configuration data as shown in FIGS. 5 to 8 comprises individual ID, version data, size and billing data of each file.

If the content server 108 transmits content, the content manager 1300 according to an embodiment checks if the transmission of all files organizing content is completed by using a package list that the content server generated.

As described above, content according to an embodiment is organized into sub-content files, which are independent to each other. The content manager 1300 stores files under download in the form of a temporary file, then renames and stores the file as an executable file if the download of files completes.

At the first time of receiving content, the content manager 1300 generates a folder for content under download by using the content master ID in a content storage, and stores sub-content files, that organize content, in lower directories of the content master ID folder, respectively.

Figures 14, 15:
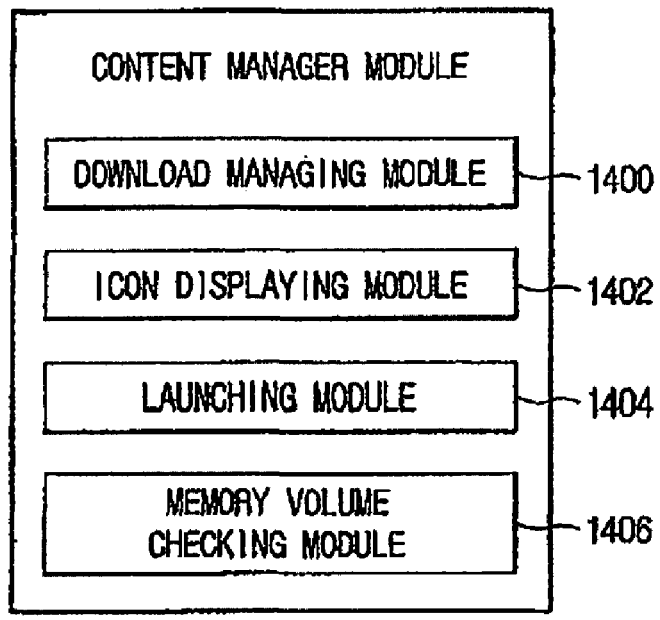
FIG. 14 shows modules consisting of the content manager according to an embodiment.
FIG. 15 shows the directory structure of content according to a embodiment.

FIG. 15 shows the directory structure of content according to one embodiment. As shown in FIG. 15, the content master ID is a higher directory, and sub-content files such as executable file, icon file, content basic data file, DLL file and resource file are stored in lower directories.

Here, the icon file comprises receiving icon data and execution icon data.

In addition, if receiving the extension pack or patch file of content, content to be extended or patched is already stored in the mobile communication terminal 100. In this case, the content manager 1300 stores files of the extension pack or patch file in lower directories of the content master ID where these files are already stored.

As described above, since content according to an embodiment is organized into several independent sub-content files, a patch file can exist independently to each sub-content file.

Thus, if receiving more than one patch file, the content manager 1300 according to an embodiment 1300 overwrites the patch file to the file that is already stored in the mobile communication terminal 100.

Each sub-content file according to an embodiment comprises individual ID data. Thus, the content manager 1300 updates a file having same individual ID of the patch file among the already stored files to the patch file Generally, in downloading files the content server 108 checks first that the mobile communication terminal 100 can receive the volume of content to be downloaded and then starts to transmit. According to an embodiment, in transmitting new patch files, if the mobile communication terminal 100 reserves memory volume equal to the patch having the largest size rather than the total volume of patch files, then it is possible to receive patch files.

Namely, since content was organized into one file, total content must be downloaded even if there was a patch file. Thus, the mobile communication terminal had to reserve the memory volume equal to the size of total content. But, according to an embodiment, content is divided into small size sub-content files, and each of these files is overwritten independently after its download completes. By this, it becomes possible to receive the patch file even if small memory volume is reserved.

Also, in case of extension pack, some of sub-content files consisting the extension pack may be identical to some of sub-content files that are already stored in the mobile communication terminal 100. In downloading the extension pack, it is possible to download patch files that are not included in the basic pack or have different size from the sub-content files consisting the basic pack.

The content storage 106 stores all kinds of content downloaded from the content server 108. The content storage 106 may be an internal memory of the mobile communication terminal 100 or external memory for storing large-size content.

FIG. 14 shows modules consisting of the content manager according to an embodiment.

As shown in FIG. 14, the content manager according to an embodiment comprises a download managing module 1400, an icon displaying module 1402, a launching module 1404, and a memory volume checking module 1406.

The download managing module 1400 manages the download of sub-content files that the content server 108 is transmitting. The download managing module 1400 checks whether or not the transmission of all sub-content files completes by using package list data that the content server 108 transmitted.

Also, in case of receiving sub-content files, the download managing module checks that a content master ID of a sub-content file in downloading is already stored in the content storage 106. If there is no content master ID of the sub-content file, then this is regarded as the first download, and thus a new fold may be generated under the name of the content master ID and the received sub-content files are stored in lower directories of the content master ID.

On the other hand, if this is not the first download, namely, in case of receiving the extension pack or patch file, the download managing module 1400 stores newly added files in the extension pack (i.e., not included in the basic pack) or patch files in lower directories of the content master ID in the content storage 106.

As describe above, since the file to be patched is already stored in the content storage 106 in case of patch file, the download managing module 1400 updates the stored files with the patch file when receiving individual patch file.

Also, in case of extension pack, some of sub-content files consisting extension pack will be identical to the sub-content files (i.e., consisting the basic pack) that are already stored in the mobile communication terminal 100. The download managing module 1400 overwrites the file that is one of extension packs and has same individual ID of the sub-content file in the basic pack patch file, and stores the file (i.e., newly-added file) that is not included in the basic pack in the lower directory of the content master ID.

The icon displaying module 1402 displays icons corresponding to content, and the icon according to an embodiment may be classified into execution icon and receiving icon.

Here, the execution icon indicates that it is possible to execute content corresponding to the icon, and if a user selects the execution icon, then content is executed.

But, the receiving icon indicates that plural individual files for content are under download, so that content is not executed when a user selects the receiving icon.

Also, if the transmission of patch files was suspended previously, the receiving icon lets the user to recognize that a continuous download is needed. Also, if the user selects the receiving icon after the transmission of patch files is suspended, the continuous download of patch files may be performed automatically.

In the present invention, when the transmission of patch files is suspended, some of sub-content files consisting content may be files corresponding to the updated unified version, some may be files corresponding to the previous unified version. In this case, there may be an error in executing content if the user executes content, so that the receiving icon has to be displayed.

The launching module 1404 transmits content basic data to the content server 108 to initiate the patch file transmission procedure for specific content.

Here, the content basic data comprises the content master ID that is transmitted from the content server 108 and content unified version data.

When requesting the existence of patch files to the content server 108, the mobile communication terminal 100 transmits content basic data to the content server 108. The content server 108 transmits the latest package list that is currently stored in the content server 108 to the mobile communication terminal 100 by the content master ID. If unified version data in the received latest package list is different from unified version data of content in the mobile communication terminal 100, the mobile communication terminal 100 will recognize that patch file is needed. As this, in case of different version, the mobile communication terminal requests the download of files having different size to the content server 108 by comparing sizes of each sub-content file in the package list with sizes of each sub-content file in the mobile communication terminal 100.

The procedure of comparing the unified version and size may be performed in the content server 108.

When the content server 108 inquires that the mobile communication terminal 100 reserves the memory as much as the size of content to be downloaded, the memory volume checking module 1406 checks the remaining memory volume of the mobile communication terminal 100.

At this time, if the remaining memory volume is less than the size of content to be downloaded, then transmission of content will not be performed.

In addition, according to an embodiment, in case of receiving patch files, the download managing module 1400 overwrites the received patch file on the existing file whenever transmission of each patch file completes. Thus, there is no need to reserve the memory volume for all patch files, but the memory volume for the largest patch file. Also, since there will be a file identical to the file in the basic pack in case of downloading the extension pack, it is also possible to download the patch file or extension pack if the memory volume for files needed to be patched and files not included in the basic pack is reserved.

Figure 16:
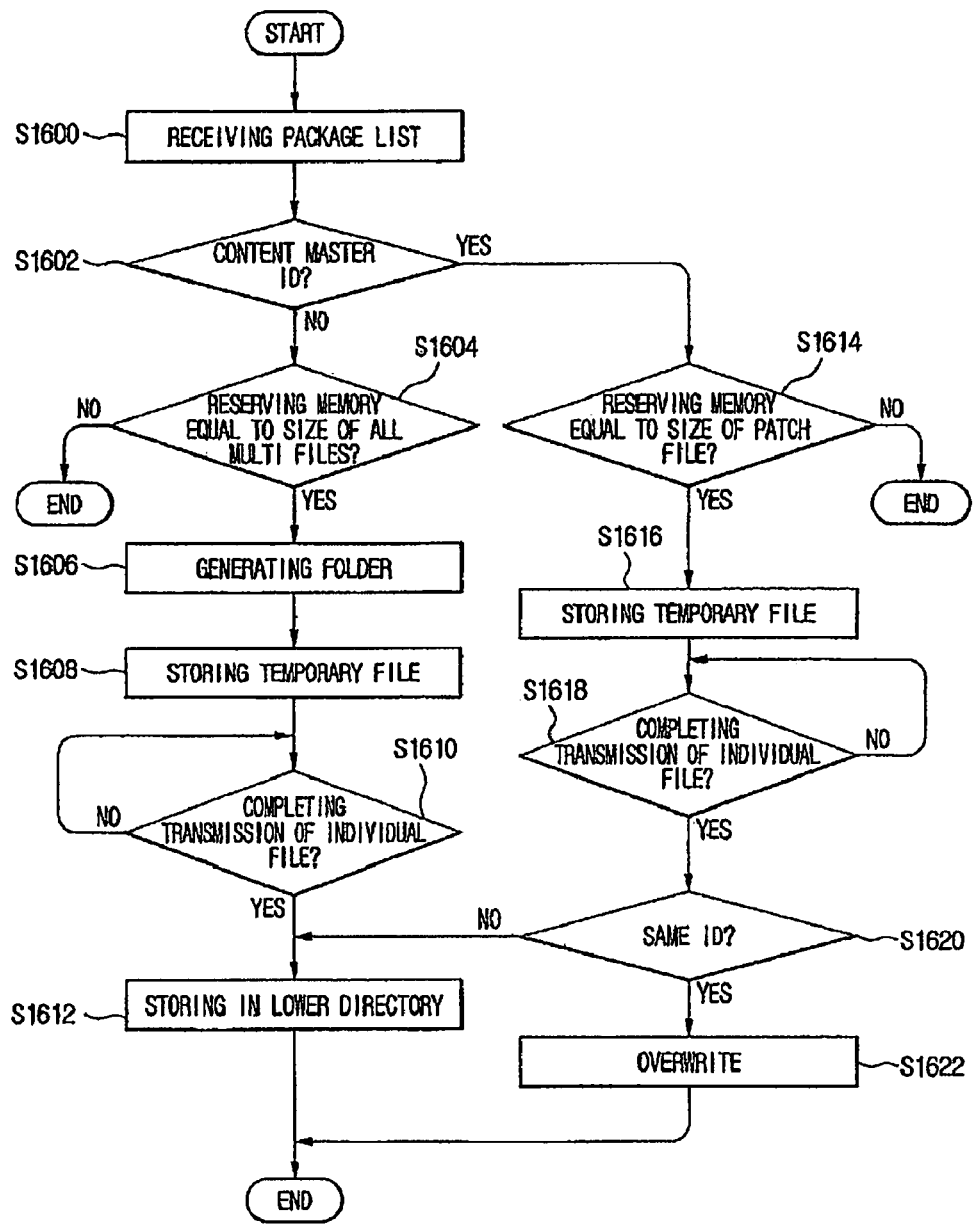
FIG. 16 is a flowchart showing the storing procedure when downloading content according to an embodiment.

FIG. 16 is a flowchart showing the storing procedure when downloading content according to one embodiment.

Referring to FIG. 16, when downloading content, the mobile communication terminal receives a package list from the content server 108 (S1600).

When receiving the package list, the mobile communication terminal 100 extracts a content master ID from the package list and checks whether or not there is the content master ID in the content storage 106 (S1602).

As it is download of new content if there is no content master ID, the mobile communication terminal 100 checks if there is enough memory volume, equal to the size of all sub-content files that consist content in the content storage 106 (S1604).

If the reserved memory volume is not enough to the size of all sub-content files, then the content download procedure finishes, otherwise, the step of generating a folder, under the higher directory with name of the content master ID will be performed (S1606).

Then, the file download procedure initiates, and the mobile communication terminal 100 stores one of sub-content files in the state of being downloaded from the content server 108 in the form of a temporary file (S1608) and checks that the transmission of individual files completes by using size data of the file under download (S1610).

If the transmission of individual files completes, these files will be stored in the lower directories of the content master ID (S1612).

On the other hand, if there is the content master ID at the above step (S602), i.e., under download of patch files or extension packs, the mobile communication terminal 100 checks whether or not the memory volume, equal to the size of the largest file that is one of patch files to be downloaded is reserved (S1614).

If the memory volume for the largest file among patch files is reserved, the procedure of receiving patch files may be performed, and at this time, since a folder having the name of the content master ID for the patch file is already exist, the file under the transmission from the content server 108, which is not completely transmitted, will be stored in the form of a temporary file without generating a folder (S1616).

Then, after checking whether or not the transmission of individual file completes (S1618), if the transmission of individual files completes, the mobile communication terminal 100 checks if there is a file among the files stored in the mobile communication terminal 100 having ID same with the transmission completed file (S1620).

At this time, as it indicates that the transmission completed file is patch file if there is the file having same ID, the step of overwriting the existing file will be performed (S1622), and as it indicates that the transmission completed file is an additional file if there is no file having same ID, the step of storing the file in the lower directory of the content master ID will be performed (S1612).

Figure 17:
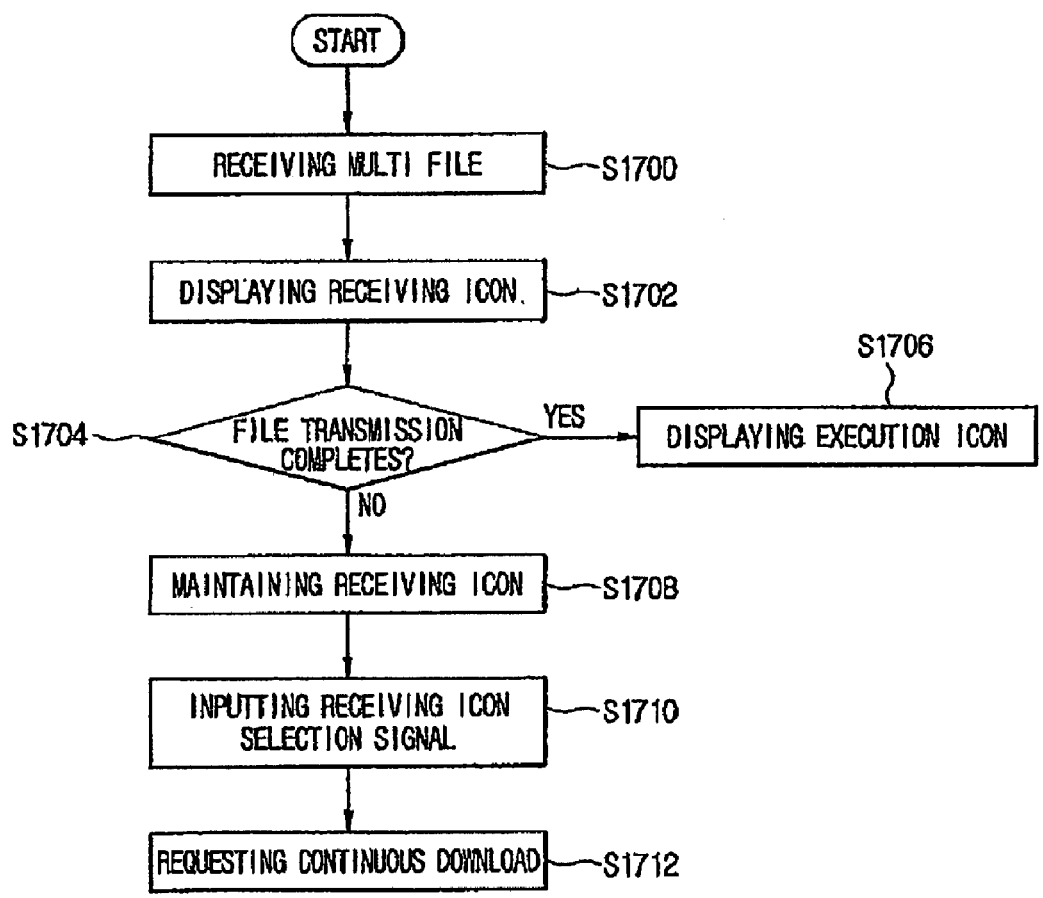
FIG. 17 is a flowchart of icon displaying procedure in downloading patch file according to an embodiment.

FIG. 17 is a flowchart of the icon displaying procedure during downloading patch files according to one embodiment.

Referring to FIG. 17, if receiving the patch file (S1700), the icon displaying module in the mobile communication terminal 100 displays a receiving icon (S1702).

Then, the completion of path file transmission is checked (S1704), and if the transmission of patch files completes, an execution icon will be displayed (S1706).

But, if the transmission of patch files is not completed at the above step (S704), namely, if there is a suspension on the transmission of patch files, the receiving icon will be maintained (S1708).

Then, if there is an icon selection signal by a user's request (S1710), the mobile communication terminal 100 requests the continuous download for the suspended file to the content server 108 (S1712).

Although the present invention describes that the receiving icon is displayed when receiving patch files In the above, it is not thus limited, and it is also possible to display an icon when downloading extension packs for prohibiting a user from executing content.

Also, it is also possible to apply the aforementioned procedure to the recovery file transmission to recover the file that the user deleted as well as the patch file transmission for updating the existing files.

The aforementioned embodiments are for describing the present invention, so those who skilled in the art will understand there will be many of alternatives, changes, and addition, and these alternatives, changes, and addition will be included within the scope of the following claims.

What is claimed is:

1. A method of providing an individual file to the mobile communication system including a content server of providing content to the mobile communication terminal, the method comprising:

receiving package list data for content stored in the mobile communication terminal, wherein the content is organized into a plurality of individual files and the package list data comprises a content master ID and an individual file data, wherein the individual files are sub-content files associated with the content, wherein the sub-content files are classified according to file types, and wherein the file types comprise an executable file, a dynamic library link (DLL) file and a resource file;

comparing, at the content server, the individual file data in the received package list with the individual file data for the content stored in the content server, wherein the individual file data comprises individual ID, size and version data of each of the individual files, and wherein the comparing comprises comparing at least one of the sizes and individual version data of two files, having the same individual ID, stored in the content server and mobile communication terminal; and transmitting, after the comparing, one of individual files stored in the content server having different individual file data from the file in the received package list data to the mobile communication terminal.

2. The method of claim 1, wherein the individual file data is at least one of individual file size and individual file version data.

3. The method of claim 2 further comprising:

producing a required file list of files having different individual file data; and transmitting the required file list to the mobile communication terminal, wherein a download agent program in the mobile communication terminal checks if the transmission of all required files completes by using the required file list.

4. A computer readable medium containing a program consisting of instructions, executable by a digital processing device of receiving individual files of content for a mobile communication terminal from a content server, that, when executed, causes the computer to perform:

receiving latest package list data corresponding to the content stored in the mobile communication terminal from the content server, wherein the content is organized into a plurality of individual files, wherein the individual files are sub-content files associated with the content, wherein the sub-content files are classified according to file types, wherein the file types comprise an executable file, a dynamic library link (DLL) file and a resource file, and wherein the latest package list data comprises a content master ID, content unified version data, and individual file data;

comparing the individual file data in the latest package list data with the individual file data for the content stored in the mobile communication terminal, wherein the individual file data comprises individual ID, size and version data of each of the individual files, and wherein the comparing comprises comparing at least one of the sizes and individual version data of two files, having the same individual ID, stored in the content server and mobile communication terminal; and requesting for download of files among a plurality of individual files in the latest package list data having different individual file data from the file in the mobile communication terminal to the content server, wherein the comparing is performed before the requesting of the download.

5. A computer readable medium containing a program consisting of instructions, executable by a digital processing device of receiving extension pack files corresponding to basic packs of content pre-stored in a mobile communication terminal from a content server, that, when executed, causes the computer to perform:

receiving extension pack package list data corresponding to the extension pack content from the content server, wherein the content is organized into a plurality of individual files, wherein the individual files are sub-content files associated with the content, wherein the sub-content files are classified according to file types, wherein the file types comprise an executable file, a dynamic library link (DLL) file and a resource file, and wherein the extension pack package list data comprises a content master ID, content unified version data and individual file data;

comparing individual file data in the extension pack package list data with individual file data for the content pre-stored in the mobile communication terminal, wherein the individual file data comprises individual ID, size and version data of each of the individual files, and wherein the comparing comprises comparing at least one of the sizes and individual version data of two files, having the same individual ID, stored in the content server and mobile communication terminal; and requesting for download of files among a plurality of individual files in the extension pack package list data having different individual file data from the file corresponding to the basic packs, wherein the comparing is performed before the requesting of the download.

* * * * *